United States Patent [19]
Kumar et al.

[11] Patent Number: 5,330,561
[45] Date of Patent: Jul. 19, 1994

[54] EXTENDED VACUUM SWING ADSORPTION PROCESS

[75] Inventors: Ravi Kumar, Allentown; Tarik Naheiri, Bath; Charles F. Watson, Orefield, all of Pa.

[73] Assignee: Air Products and Chemicals, Inc., Allentown, Pa.

[21] Appl. No.: 47,559

[22] Filed: Mar. 25, 1993

Related U.S. Application Data

[63] Continuation-in-part of Ser. No. 976,878, Nov. 16, 1992, abandoned.

[51] Int. Cl.$^5$ .......................................... B01D 53/04
[52] U.S. Cl. .................................... 95/101; 95/105; 95/119; 95/122; 95/130; 95/139
[58] Field of Search .................... 95/98, 100–105, 95/119, 122, 130, 139, 148

[56] References Cited

U.S. PATENT DOCUMENTS

| | | | |
|---|---|---|---|
| 3,430,418 | 3/1969 | Wagner | 55/25 |
| 3,636,679 | 1/1972 | Batta | 55/26 |
| 3,717,974 | 2/1973 | Batta | 55/58 |
| 3,738,087 | 6/1973 | McCombs | 55/58 |
| 3,957,463 | 5/1976 | Drissel et al. | 55/25 |
| 3,986,849 | 10/1976 | Fuderer et al. | 55/25 |
| 4,077,780 | 3/1978 | Doshi | 95/100 |
| 4,194,892 | 3/1980 | Jones et al. | 55/58 |
| 4,326,858 | 4/1982 | Benkmann | 55/26 |
| 4,329,158 | 5/1982 | Sircar | 55/26 |
| 4,406,675 | 9/1983 | Dangieri et al. | 55/26 |
| 4,431,432 | 2/1984 | Amitani et al. | 95/100 |
| 4,461,630 | 7/1984 | Cassidy et al. | 95/100 |
| 4,475,930 | 10/1984 | Asztalos | 95/98 |
| 4,519,813 | 5/1985 | Hagiwara et al. | 95/101 |
| 4,589,888 | 5/1986 | Hiscock et al. | 55/26 |
| 4,614,525 | 9/1986 | Reiss | 55/25 |
| 4,650,500 | 3/1987 | Patel | 95/100 |
| 4,650,501 | 3/1987 | Hiscock et al. | 55/26 |
| 4,684,377 | 8/1987 | Haruna et al. | 55/26 |
| 4,756,723 | 7/1988 | Sircai | 55/25 |
| 4,761,165 | 8/1988 | Stöcker et al. | 95/98 X |
| 4,781,735 | 11/1988 | Tagawa et al. | 55/26 |
| 4,834,780 | 5/1989 | Benkmann | 95/139 |
| 4,917,710 | 4/1980 | Haruna et al. | 55/26 |
| 4,948,391 | 8/1990 | Noguchi | 55/26 |
| 4,969,935 | 11/1990 | Hay | 55/26 |
| 4,981,499 | 1/1991 | Hay et al. | 55/26 |
| 5,015,271 | 5/1991 | Keiss | 55/25 |

FOREIGN PATENT DOCUMENTS

| | | |
|---|---|---|
| 273723 | 7/1988 | European Pat. Off. . |
| 0354259 | 2/1990 | European Pat. Off. . |
| 0449448 | 10/1991 | European Pat. Off. . |
| 5935141 | 9/1985 | Japan . |
| 59255060 | 6/1986 | Japan . |
| 1559325 | 1/1980 | United Kingdom . |
| 1594454 | 7/1981 | United Kingdom . |
| 2109266 | 6/1983 | United Kingdom . |
| 2154895 | 9/1985 | United Kingdom . |
| 2227685 | 8/1990 | United Kingdom . |
| WO91-12874 | 9/1991 | World Int. Prop. O. . |

Primary Examiner—Robert Spitzer
Attorney, Agent, or Firm—Geoffrey L. Chase; James C. Simmons; William F. Marsh

[57] ABSTRACT

A process for separating a feed gas mixture into a more strongly adsorbable component and a less strongly adsorbable component in a plurality of adsorbent beds containing an adsorbent selective for the more strongly adsorbable component using pressure equalization between beds after initial depressurization to provide a purge gas, using countercurrent evacuation wherein at least two adsorption beds are countercurrently evacuated simultaneously in overlapping countercurrent evacuation steps in the plurality of adsorption beds, and using a combination of less strongly adsorbable component and feed gas mixture to repressurize the adsorbent bed. Oxygen product can be recovered from air at high recovery using the process.

22 Claims, 3 Drawing Sheets

EXTENDED VACUUM SWING ADSORPTION PROCESS

This is a continuation-in-part of U.S. application Ser. No. 07/976,878 filed Nov. 16, 1992, now abandoned.

FIELD OF THE INVENTION

The present invention is directed to a vacuum swing adsorption process for the separation of a more strongly adsorbable component from a less strongly adsorbable component in a gas mixture with high recovery of the less strongly adsorbable component at approximately feed pressure. More specifically, the present invention is a vacuum swing adsorption process for the separation of air to recover oxygen as a relatively unadsorbed product at high recovery and approximately feed pressure using overlapping evacuation steps in a multi-bed process.

BACKGROUND OF THE PRIOR ART

Oxygen is a commodity chemical in the industrial gas industry. It has numerous applications including waste water treatment, glass melting furnaces, and the steel industry. One of the most common methods of oxygen production is by cryogenic distillation of air. However, this technology is not competitive for small size oxygen plants ($<100$ TPD $O_2$). The technology of choice for this size range is adsorption. There is a need in the marketplace to produce oxygen at low capital and energy costs by adsorptive gas separation.

Adsorptive processes are extensively used in the industry to produce oxygen from air for small size oxygen plants ($<100$ TPD $O_2$). There are two major categories of these processes—pressure swing adsorption processes (PSA) and vacuum swing adsorption processes (VSA). The pressure swing adsorption processes carry out the adsorption (feed) step at pressures much higher than ambient and adsorbent regeneration at pressures close to ambient. The adsorbent beds go through secondary process steps, such as pressure equalizations, depressurizations, blowdowns, and purge or various combinations of these during the cycle. Some of the $O_2$-PSA processes are described in U.S. Pat. Nos. 3,430,418; 3,636,679; 3,717,974; 3,738,087; 4,326,858; 4,329,158; 4,589,888; 4,650,501; 4,948,391; 4,969,935; 4,981,499; and U.K. Patent GB 2,227,685A.

These processes tend to be energy intensive and more suitable for smaller oxygen plants producing less than 40 tons of oxygen per day and preferably less than 20 tons of oxygen per day. A subset of $O_2$ PSA processes is a rapid pressure swing adsorption (RPSA) process. As the name implies, this process involves similar steps as a PSA process, but carries out these steps very quickly. Some examples of this process are U.S. Pat. Nos. 4,194,892 and 4,406,675. Again, this process tends to be energy intensive and suitable for oxygen plants even smaller than $O_2$ PSA's.

Primary reasons for high energy consumption in PSA processes are: (1) $O_2$ recovery from these processes is low, and (2) the entire feed stream has to be compressed up to the adsorption pressure. These inefficiencies are somewhat circumvented in vacuum swing adsorption (VSA) processes. In these processes, adsorption is carried out at pressure close to ambient and adsorbent regeneration is carried out at sub-atmospheric levels. The adsorbent beds go through several secondary steps with the primary aim of increasing oxygen recovery and reducing adsorbent inventory per unit of product gas.

U.S. Pat. No. 3,957,463 describes an $O_2$VSA process comprised of the steps of: adsorption, evacuation and product repressurization. The process consists of two trains of two adsorbent beds in each train. The beds on the feed end of each train remove water and carbon dioxide from air, and the beds on the product end of each train remove nitrogen from air. Oxygen produced from the process is stored for later use as product and repressurization gas in a tank.

GB Patent 1,559,325 describes several two and three bed $O_2$VSA processes. The two bed $O_2$VSA processes have the steps: adsorption, evacuation, and product repressurization with the addition of purging the bed during evacuation and repressurizing it after evacuation with gas being continuously produced by the bed on adsorption step. The three bed options have similar steps with the addition that all the effluent gas from a bed toward the end of its adsorption step is fed to the bed which has finished product repressurization and is ready to go on to the air feed step. Effluent from the second bed is also withdrawn as oxygen product. A vacuum pump operates continuously in the three bed options, and the product take off is also continuous. GB Patent 1,594,454 describes the control strategy for $O_2$VSA process disclosed in GB Patent 1,559,325.

Japanese patent application 59-255060 (255,060/84) describes a four bed $O_2$VSA process with the process steps: adsorption, cocurrent depressurization, evacuation, vacuum purge, pressure equalization, and product repressurization. In this process, the gas obtained during the cocurrent depressurization step is used for the pressure equalization steps and then vacuum purge.

U.K. Patent application GB 2,154,895A describes three bed $O_2$VSA processes with process steps: adsorption, cocurrent depressurization, evacuation, vacuum purge, pressure equalization(s), and simultaneous feed repressurization with product end to product end pressure equalization. The cocurrent depressurized gas is used for pressure equalization(s) and vacuum purge.

Japanese patent application 1984-[Showa 59]-35,141 describes a three bed $O_2$VSA process with these steps: adsorption, evacuation with continuous purge, and repressurization. In this process, vacuum purge and repressurization are carried out by product oxygen.

U.K. Patent GB 2,109,266B describes three and four bed $O_2$VSA processes comprised of steps: adsorption, provide purge gas, evacuation, vacuum purge, and product repressurization steps. The purge gas used for vacuum purge step is provided either by cocurrent depressurization of the bed, which has finished its adsorption step, or by continuing the feed to the bed on its adsorption step but directing all the effluent from this bed to the bed on a vacuum purge step.

U.S. Pat. No. 4,614,525 suggests an improvement to $O_2$VSA processes by heating the feed mixture by heat exchange with the vacuum pump.

U.S. Pat. No. 4,684,377 outlines a three bed $O_2$VSA process with steps: adsorption, simultaneous cocurrent depressurization and evacuation, evacuation, product end to product end pressure equalization by gas from the product end of the bed on simultaneous cocurrent depressurization, and evacuation step and product repressurization.

U.S. Pat. No. 4,756,723 describes an adsorptive process for oxygen production where adsorption is carried out at superambient pressure. This is followed by countercurrent depressurization, evacuation and product repressurization to adsorption pressure. Part of the gas discharged during the countercurrent depressurization step may also be used for pressure equalization with a bed before the product repressurization step.

U.S. Pat. No. 4,917,710 describes a two bed $O_2VSA$ process with a product storage vessel. Process cycle steps are: adsorption, cocurrent depressurization, simultaneous cocurrent depressurization and evacuation, evacuation, vacuum purge by product, vacuum purge by gas obtained in a cocurrent depressurization step, simultaneous pressure equalization and product repressurization, and simultaneous feed and product repressurization. Gas for product repressurization and product purge is obtained from the product storage vessel. Gas for pressure equalization is obtained from the bed on simultaneous cocurrent depressurization and evacuation step.

U.S. Pat. No. 4,781,735 and European patent application 0 273 723 describe a three bed $O_2VSA$ process with steps: adsorption, feed to feed or dual end pressure equalization, cocurrent depressurization, evacuation, vacuum purge by gas obtained in cocurrent depressurization step, product repressurization from bed on feed step, simultaneous feed repressurization and feed to feed or dual end pressure equalization.

European patent application 0 354 259 outlines various options for a two bed $O_2VSA$ process: adsorption, cocurrent depressurization, evacuation, pressure equalization with gas obtained in cocurrent depressurization step and feed repressurization. Some options include vacuum purge by product gas from the bed on adsorption step.

U.S. Pat. No. 4,969,935 describes a three bed $O_2VSA$ process with steps: adsorption, simultaneous cocurrent depressurization and countercurrent evacuation, countercurrent evacuation, vacuum purge by product, product end to product end pressure equalization followed by product end to feed end pressure equalization using cocurrently depressurized gas and product repressurization.

U.S. Pat. No. 5,015,271 describes an $O_2VSA$ process with the steps: adsorption, simultaneous cocurrent depressurization and countercurrent evacuation or feed, countercurrent evacuation, simultaneous product to product pressure equalization and feed repressurization, or vacuum purge, simultaneous feed and product repressurization and feed repressurization.

French Patent WO91/12874; PCT/FR91/00164 describes a two bed $O_2VSA$ process with basic process steps of adsorption, depressurization, evacuation, vacuum purge by product, pressure equalization and repressurization. Three variations are outlined.

European Patent 0 449 448 A1 outlines a two bed process with steps: adsorption, simultaneous evacuation and cocurrent depressurization, evacuation, product purge under vacuum, pressure equalization and product repressurization.

U.S. Pat. No. 3,986,849 describes a pressure swing adsorption process which has simultaneous overlapping beds on its adsorption process step, but other process steps are not recited to overlap one another in parallel beds.

Despite the prior art, a need still exists for an $O_2VSA$ process with higher oxygen recovery (i.e. lower energy costs) and lower adsorbent requirement per unit of oxygen production (i.e. lower capital costs) than the current processes in the large size range (greater than 100 tons per day). The present invention outlines a multi-bed (an at least four) bed vacuum swing adsorption (VSA) process to produce oxygen from air at higher oxygen recovery and lower adsorbent requirement per unit of oxygen product than current $O_2VSA$ processes.

BRIEF SUMMARY OF THE INVENTION

The present invention is a process for selectively separating a more strongly adsorbable component from a less strongly adsorbable component of a feed gas mixture in a plurality of adsorption beds containing an adsorbent selective for the more strongly adsorbable component, comprising the steps of:

(a) introducing a feed gas mixture at high pressure containing the more strongly adsorbable component and the less strongly adsorbable component into an inlet of a first adsorption bed containing the adsorbent selective for the more strongly adsorbable component and adsorbing the more strongly adsorbable component on the adsorbent while the less strongly adsorbable component passes through the first bed unadsorbed until the adsorption front of the more strongly adsorbable component approaches an outlet of the first bed and terminating the introduction of the feed gas mixture;

(b) following the termination of the introduction of the feed gas mixture into the first bed and without any intervening steps, cocurrently depressurizing the first bed to a lower pressure to remove the gas mixture from the first bed and passing the gas mixture to an outlet of another bed of the plurality of adsorption beds at lower pressure to countercurrently purge the more strongly adsorbable component from the other bed;

(c) countercurrently evacuating the first bed under vacuum conditions to further remove the more strongly adsorbable component at the lowest pressure;

(d) countercurrently purging the first bed with cocurrently depressurizing gas mixture from another bed of the plurality of adsorption beds undergoing step (b) to remove additional more strongly adsorbable component from the first bed;

(e) repressurizing the first bed with less strongly adsorbable component from another bed of the plurality of adsorption beds currently undergoing step (a) and with feed gas mixture; and (f) performing steps (a) through (e) in each of the plurality of adsorption beds in a phased sequence wherein at least two adsorption beds are countercurrently evacuated simultaneously in overlapping countercurrent evacuation steps in the plurality of adsorption beds.

Preferably, the bed is repressurized initially with feed gas mixture and then with said less strongly adsorbable component.

Preferably, the bed is repressurized with ambient pressure feed gas mixture and high pressure feed gas mixture.

Preferably, the bed is repressurized with ambient pressure feed gas mixture and then with the less strongly adsorbable component.

Preferably, the bed is repressurized initially with ambient pressure feed gas mixture, then with high pressure feed gas mixture and finally with less strongly adsorbable component.

Most preferably, the bed is repressurized initially with less strongly adsorbable component and then with feed gas mixture.

Preferably, the bed is repressurized initially with said less strongly adsorbable component then with ambient pressure feed gas mixture.

Preferably, the bed is repressurized initially with said less strongly adsorbable component then with ambient pressure feed gas mixture and then with high pressure feed gas mixture.

Further alternatively, the bed is repressurized with less strongly adsorbable component and feed gas mixture simultaneously.

Further alternatively, the bed is repressurized with less strongly adsorbable component and ambient pressure feed gas mixture simultaneously.

Further alternatively, the bed is repressurized with less strongly adsorbable component and high pressure feed gas mixture simultaneously.

Preferably, the feed gas mixture is air, the more strongly adsorbable component is nitrogen and the less strongly adsorbable component is oxygen.

Preferably, a bed finishing cocurrent depressurization is then further cocurrently depressurized to pressure equalize with another bed of the plurality of adsorption beds finishing countercurrent purge while the former bed is simultaneously countercurrently evacuated.

The present invention is also a process for selectively separating a more strongly adsorbable component from a less strongly adsorbable component of a feed gas mixture in a plurality of adsorption beds containing an adsorbent selective for the more strongly adsorbable component, comprising the steps of:

(a) introducing a feed gas mixture at high pressure containing the more strongly adsorbable component and the less strongly adsorbable component into an inlet of a first adsorption bed containing an adsorbent selective for the more strongly adsorbable component and adsorbing the more strongly adsorbable component on the adsorbent while the less strongly adsorbable component passes through the first bed unadsorbed until the adsorption front of the more strongly adsorbable component approaches an outlet of the first bed and terminating the introduction of the feed gas mixture;

(b) following the termination of the introduction of the feed gas mixture into the first bed and without any intervening steps, cocurrently depressurizing the first bed to a lower pressure to remove the gas mixture from the first bed and passing the gas mixture to an outlet of a second bed of the plurality of adsorption beds at lower pressure to countercurrently purge the more strongly adsorbable component from the second bed;

(c) cocurrently depressurizing the first bed to further remove the gas mixture from the first bed and to pressure equalize the first bed with another bed of the plurality of adsorption beds finishing countercurrent purge of step (e);

(d) countercurrently evacuating the first bed under vacuum conditions to further remove the more strongly adsorbable component at a lowest pressure;

(e) countercurrently purging the first bed with cocurrently depressurizing gas mixture from another bed of the plurality of adsorption beds undergoing step (b) to remove additional more strongly adsorbable component from the first bed;

(f) countercurrently pressure equalizing the first bed with another bed of the plurality of adsorption beds at higher pressure undergoing the cocurrent depressurization of step (c);

(g) repressurizing the first bed with less strongly adsorbable component from another bed of the plurality of adsorption beds currently undergoing step (a) and with feed gas mixture at the high pressure; and (f) performing steps (a) through (g) in each of the plurality of adsorption beds in a phased sequence wherein at least two adsorption beds are countercurrently evacuated simultaneously in overlapping countercurrent evacuation steps in the plurality of adsorption beds.

The present invention is further the process for selectively separating nitrogen from oxygen in air in four adsorption beds containing an adsorbent selective for nitrogen, comprising the steps of:

(a) introducing feed air at high pressure into an inlet of a first adsorption bed containing an adsorbent selective for nitrogen and adsorbing nitrogen on the adsorbent while oxygen passes through the first bed unadsorbed as a product until the adsorption front of nitrogen approaches an outlet of the first bed and terminating the introduction of air into the first bed;

(b) following the termination of the introduction of air into the first bed and without any intervening steps, cocurrently depressurizing the first bed to remove void space gas and oxygen from the first bed and passing the void space gas and oxygen to an outlet of another bed of the four adsorption beds at lower pressure to countercurrently purge the nitrogen from the other bed;

(c) cocurrently depressurizing the first bed to further remove the void space gas and oxygen from the first bed and to pressure equalize the first bed with another bed of the four adsorption beds finishing the countercurrent purge of step (e);

(d) countercurrently evacuating the first bed under vacuum conditions to further remove the void space gas and nitrogen at a lowest pressure;

(e) countercurrently purging the first bed with cocurrently depressurizing void space gas and nitrogen from another bed of the four adsorption beds undergoing step (b) to remove additional nitrogen from the first bed;

(f) countercurrently pressure equalizing the first bed with another bed of the four adsorption beds at higher pressure undergoing the cocurrent depressurization of step (c);

(g) repressurizing the first bed with oxygen from another bed of the four adsorption beds currently undergoing step (a) and with feed air at the high pressure; and (f) performing steps (a) through (g) in each of the four adsorption beds in a phased sequence wherein at least two adsorption beds are countercurrently evacuated simultaneously in overlapping countercurrent evacuation steps in the plurality of adsorption beds.

Preferably, the feed air is at a pressure in the range of approximately 14–30 psia.

More preferably, the feed air is at a pressure in the range of approximately 14–24 psia.

DETAILED DESCRIPTION OF THE INVENTION

Figure 1:
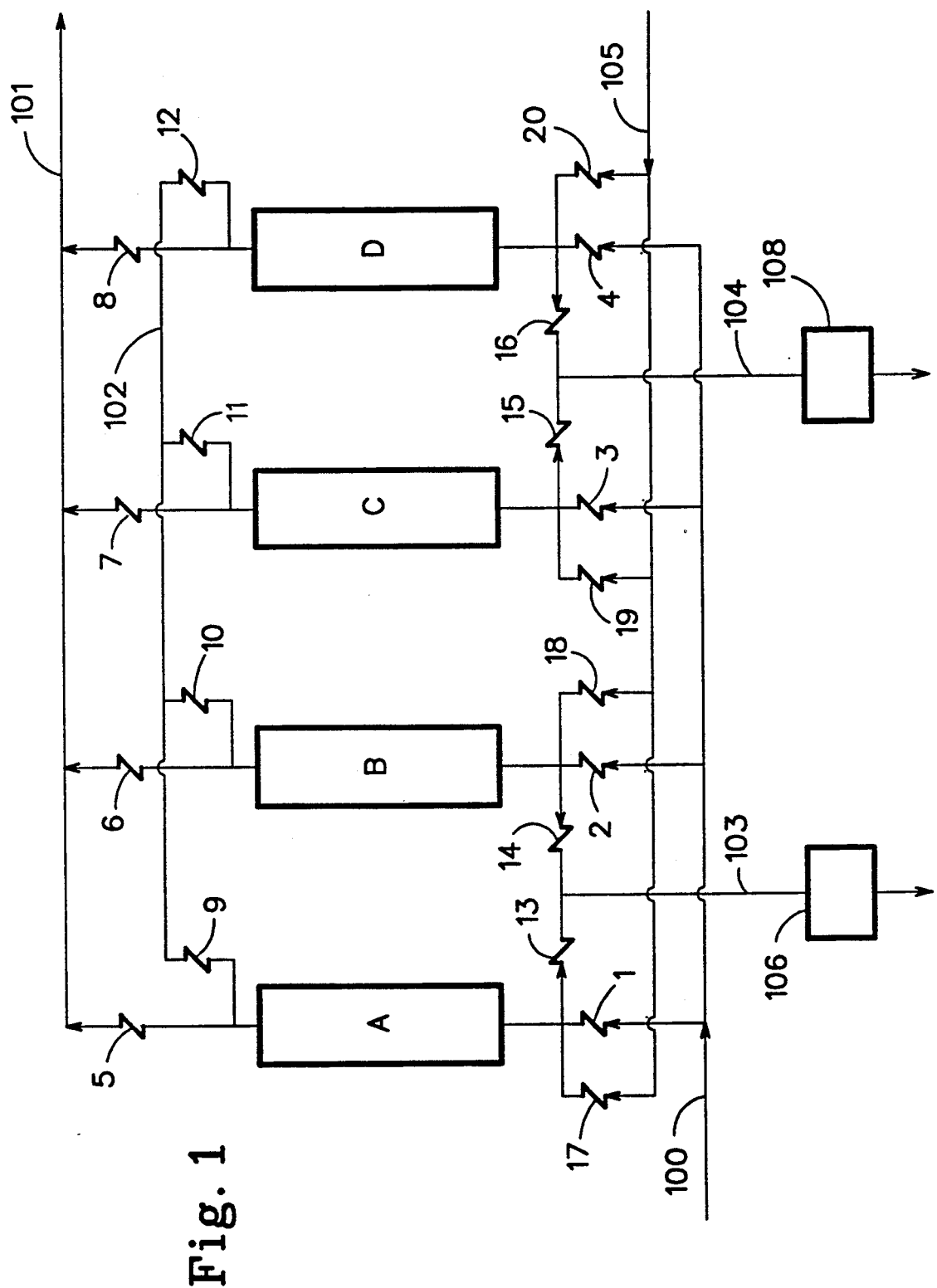
FIG. 1 is a schematic drawing of a preferred embodiment of the present invention using four parallel adsorption beds and appropriate valve manifolding for feed, evacuation, purge, equalization and repressurization.

The present invention will now be described with regard to several preferred embodiments with the initial embodiment excluding pressure equalization and the second embodiment including pressure equalization.

The first embodiment has the following steps:
1. Adsorption (A),
2. Cocurrent depressurization (DP),
3. Countercurrent evacuation (DES),
4. Countercurrent purge (PU),
5. Product repressurization (PRP), or Sequential product (PRP) and feed repressurization, or sequential feed and product repressurization, or simultaneous product and feed repressurization. Feed repressurization can be further divided into two parts, the first being carried out by ambient air (AARP) and the second by high pressure feed (Feed RP)(15-30 psia).

A process cycle chart for this option with simultaneous repressurization is outlined in Table 1.

TABLE 1

| Bed # | Four Bed $O_2$ VSA | | | | | | | |
|---|---|---|---|---|---|---|---|---|
| A |   | DES |   | PU  | RP |   | A   |   | DP |
| C | A | DP  |   | DES |    |   | PU  | RP | A  |
| B | RP| A   |   | DP  |    |   | DES |   | PU |
| D | DES | PU | RP | A  |    |   | DP  |   | DES |

A - Adsorption (Feed)
DP - Cocurrent depressurization
DES - Countercurrent Evacuation
PU - Countercurrent Vacuum Purge
RP - Repressurization Process steps for the first embodiment will now be described in detail:

1. Adsorption (A), which consists of:
   a. Flowing the feed gas stream, consisting of atmospheric air at a pressure of 14.5-30 psia and a temperature of ~0°-150° F. through a bed packed with one or more adsorbents capable of selectively adsorbing water, carbon dioxide, and nitrogen from air.
   b. Withdrawing an effluent stream consisting of $O_2$ product at feed pressure. Part of this stream is immediately used as repressurization gas for bed on step 5 and the remainder constitutes oxygen product.
   Continuing steps 1(a) and 1(b) for a predetermined cycle time or until the concentration of nitrogen impurity in the effluent stream reaches a preset limit. The bed is now called "spent" because it has exhausted its capacity for removing nitrogen from feed gas.

2. Cocurrent Depressurization Step (DP), which consists of:
   a. Discontinuing the feed flow through the spent bed and transferring the feed to another VSA bed.
   b. Reducing the pressure in the spent VSA bed from the adsorption pressure level to some "intermediate" level (7.7-21 psia) by connecting the product end of this bed with the product end of the VSA bed on step 4 of its cycle.
   c. Discontinuing the above step when the pressure in the spent VSA bed has reached the predetermined intermediate pressure level. Preferably, the intermediate pressure is close to, but not lower than, the average of feed and lowest evacuation pressure reached in the VSA bed at the end of step 3 of its cycle.

3. Countercurrent Evacuation Step (DES), which consists of:
   a. Further reducing the pressure in the spent bed from intermediate level to the "lowest" level (1.0-10 psia) by connecting the feed or the feed and the product ends of the spent VSA bed with a vacuum pump.
   b. Continuing the above step until the pressure in the VSA bed has reached the predetermined lowest pressure level.

4. Countercurrent Purge Step (PU), which consists of:
   a. Continue evacuation of the VSA bed from the feed end.
   b. Connect the product end of this bed with another VSA bed on step 2 of its cycle.
   c. Continuing the above steps until pressure in this bed has reached to a "low" level (1.2-20 psia) and pressure in the VSA bed on step 2 has reached the intermediate pressure level.

5. Repressurization Step, which consists of: a. Discontinuing evacuation of the above bed and start evacuating another VSA bed. This bed is now called "regenerated" since its capacity for $N_2$, $H_2O$ and $CO_2$ removal from air has been restored.

A. Product Repressurization Step (PRP), which consists of:
      b. Connecting the product end of the regenerated bed with the product end of the bed on step 1 of its cycle.
      c. Continuing the above step until pressure in the regenerated bed has reached the predetermined pressure level, which is close to or equal to the predetermined adsorption pressure.

OR

B. Ambient air and/or Feed Repressurization, which consists of:
      b. Connecting the feed end of the regenerated bed to ambient air or connecting it to the feed blower.
   or
   Opening the feed end of the regenerated bed to ambient air.
      $b_1$ Continuing the above step until pressure in the regenerated bed is close to or equal to ambient pressure.
      $b_2$ Disconnecting the feed end of the regenerated bed from ambient air and connecting it to the feed blower.
   Continuing the above ambient air and/or feed repressurization step until pressure in the regenerated bed is close to or equal to the predetermined adsorption pressure level.

OR

C. Simultaneous Product and Ambient Air and/or Feed Repressurization Step (PRP/AARP and/or FRP), which consists of:
      b. Connecting the product end of the regenerated bed with the product end of the bed on step 1 of its cycle and opening the feed end of the regenerated bed to ambient air or connecting the feed end of the regenerated bed to feed blower.
   or Connecting the product end of the regenerated bed with the product end of the bed on step 1 of its cycle and opening the feed end of the regenerated bed to ambient air.

$b_1$ Continuing the above step until pressure in the regenerated bed is close to or equal to ambient pressure.

$b_2$ Disconnecting the feed end of the regenerated bed from ambient air and connecting it to feed blower.

c. Continuing the above step until pressure in the regenerated bed is close to or equal to the predetermined adsorption pressure.

OR

Sequential Product and Ambient Air and/or Feed Repressurization Step (PRP/AARP and/or FRP), which consists of:

b. Connecting the product end of the regenerated bed with the product end of the bed on step 1 of its cycle.

c. Continuing the above step until pressure in the regenerated bed has reached the predetermined pressure level, which is lower than the adsorption pressure.

d. Discontinuing the product repressurization and opening the feed end of the regenerated bed to ambient air or connecting it to the feed blower.

or

Discontinuing the product repressurization and opening tile feed end of the regenerated bed to ambient air.

bed has reached the predetermined pressure level, which is lower than the adsorption pressure.

d. Discontinuing the ambient air and/or feed repressurization step and connecting the product end of the regenerated bed with the product end of the bed on step 1 of its cycle.

e. Continuing the above step until the pressure in the regenerated bed is close to or equal to the predetermined adsorption pressure.

This bed is now ready to undergo a new cycle starting from step 1(a).

The second embodiment has the following steps:
1. Adsorption (A),
2. Cocurrent depressurization to provide purge gas (DP1),
3. Cocurrent depressurization to provide pressure equalization gas (DP2),
4. Countercurrent evacuation (DES),
5. Countercurrent purge (PU),
6. Pressure equalization (PE).
7. Product repressurization (PRP), or sequential product (PRP) and feed repressurization, or sequential feed and product repressurization, or simultaneous product and feed repressurization. Feed repressurization can be further divided into two parts, the first being carried out by ambient air (AARP) and the second by high pressure feed (Feed RP).

A process cycle chart for this option is outlined in Table 2.

TABLE 2

Four Bed $O_2$ VSA

| Bed # | | | | | | | | | | | |
|---|---|---|---|---|---|---|---|---|---|---|---|
| A | DP2 | | DES | | | PU | PE | RP | | A | DP1 |
| C | A | | DP1 | DP2 | | DES | | | PU | PE | RP | A |
| B | PE | RP | | A | | DP1 | DP2 | | DES | | PU |
| D | DES | PU | | PE | RP | A | | | DP1 | DP2 | DES |

A - Adsorption (Feed)
DP1 - First Cocurrent Depressurization to Provide Purge
DP2 - Second Cocurrent Depressurization to Provide Pressure Equalization
DES - Countercurrent Evacuation
PU - Countercurrent Vacuum Purge
RP - Repressurization $d_1$ Continuing the above step until pressure in the regenerated bed is close to or equal to ambient pressure.

$d_2$ Disconnecting the feed end of the regenerated bed from ambient air and connecting it to the feed blower.

e. Continuing the above step until the pressure in the regenerated bed is close to or equal to the predetermined adsorption pressure.

OR

E. Sequential Ambient air and/or Feed and Product Repressurization, which consists of:

b. Connecting the feed end of the regenerated bed to ambient air or connecting it to the feed blower.

or Opening the feed end of the regenerated bed to ambient air.

$b_1$ Continuing the above step until pressure in the regenerated bed is close to or equal to ambient pressure.

$b_2$ Disconnecting the feed end of the regenerated bed from ambient air and connecting it to the feed blower.

c. Continuing the above ambient air and/or feed repressurization step until pressure in the regenerated Process steps for the second embodiment will now be described in detail:

1. Adsorption Step (A), which consists of:
   a. Flowing the feed gas stream, consisting of atmospheric air at a pressure of 14-30 psia and temperature of -0°-150° F. through a bed packed with one or more adsorbents capable of selectively adsorbing water, carbon dioxide, and nitrogen from air.
   b. Withdrawing an effluent stream consisting of $O_2$ product at feed pressure. Part of this stream is immediately used as repressurization gas for bed on step 7 and the remainder constitutes oxygen product.
   c. Continuing steps 1(a) and 1(b) for a predetermined cycle time or until the concentration of nitrogen impurity in the effluent stream reaches a preset limit. The bed is now called "spent" because it has exhausted its capacity for removing nitrogen from feed gas.

2. Cocurrent Depressurization Step (DP1), which consists of:
   a. Discontinuing the feed flow through the spent bed and transferring the feed to another VSA bed.

b. Reducing the pressure in the spent VSA bed from the adsorption pressure level to some "intermediate" level (11.5-25 psia) by connecting the product end of this bed with the product end of the VSA bed on step 5 of its cycle.

c. Discontinuing the above step when the pressure in the spent VSA bed has reached the predetermined intermediate pressure level.

3. Cocurrent Depressurization Step (DP2), which consists of:

a. Further reducing the pressure in the spent VSA bed from "intermediate level" to some "lower level" (7.7-21.3 psia) by connecting the product end of this bed with the product end of the VSA bed on step 6 of its cycle.

b. Discontinuing the above step when the pressure in the spent VSA bed has reached the predetermined "lower level". Preferably this pressure is the average of bed pressures at the end of steps 2 and 5.

Countercurrent Evacuation Step (DES), which consists of:

a. Further reducing the pressure in the spent bed from lower level to the "lowest" level (1.0-10.0 psia) by connecting the feed or the feed and the product ends of the spent VSA bed with a vacuum pump.

b. Continuing the above step until the pressure in the VSA bed has reached the predetermined lowest pressure level.

Countercurrent Purge Step (PU), which consists of:

a. Continuing evacuation of the VSA bed from the feed end.

b. Connecting the product end of this bed with another VSA bed on step 2 of its cycle.

c. Continuing the above steps until pressure in this bed has reached a "low" level (1.2-20 psia) and pressure in the VSA bed on step 2 has reached to the intermediate pressure level.

6. Pressure Equalization Step (PE), which consists of:

a. Discontinuing evacuation of the above bed and start evacuating another VSA bed. This bed is now called "regenerated" since its capacity for $N_2$, $H_2O$, and $CO_2$ removal from air has been restored.

b. Connecting the product end of the regenerated bed with the product end of the bed on step 3 of its cycle.

c. Continuing the above step for a predetermined time or until pressure in bed has reached the predetermined lower level.

7. Repressurization Step, which consists of:

a. Discontinuing the pressure equalization of regenerated bed.

A. Product Repressurization (PRP), which consists of:

b. Connecting the product end of the pressure equalized regenerated bed with the product end of the bed on step 1 of its cycle. 'c. Continuing the above step until pressure in the regenerated bed is close to or equal to the predetermined adsorption pressure.

OR

B. Ambient air and/or Feed Repressurization, which consists of:

b. Connecting the feed end of the regenerated bed to ambient air or connecting it to the feed blower.

or

Opening the feed end of the regenerated bed to ambient air.

$b_1$ Continuing the above step until pressure in the regenerated bed is close to or equal to ambient pressure.

$b_2$ Disconnecting the feed end of the regenerated bed from ambient air and connecting it to the feed blower.

c. Continuing the above ambient air and/or feed repressurization step until pressure in the regenerated bed is close to or equal to the predetermined adsorption pressure level.

OR c. Simultaneous Product and Ambient Air and/or Feed Repressurization Step (PRP/AARP, and/or FRP), which consists of:

b. Connecting the product end of the regenerated bed with the product end of the bed on step 1 of its cycle and opening the feed end of the regenerated bed to ambient air or connecting the feed end of the regenerated bed to feed blower.

or

Connecting the product end of the regenerated bed with the product end of the bed on step 1 of its cycle and opening the feed end of the regenerated bed to ambient air.

$b_1$ Continuing the above step until pressure in the regenerated bed is close to or equal to ambient pressure.

$b_2$ Disconnecting the feed end of the regenerated bed from ambient air and connecting it to feed blower.

c. Continuing the above step until pressure in the regenerated bed is close to or equal to the predetermined adsorption pressure.

OR

D. Sequential Product and Ambient Air and/or Feed Repressurization Step (PRP/AARP and/or FRP), which consists of:

b. Connecting the product end of the regenerated bed with the product end of the bed on step 1 of its cycle.

c. Continuing the above step until pressure in the pressure equalized regenerated bed has reached the predetermined pressure level, which is lower than the adsorption pressure.

d. Discontinuing the product repressurization and opening the feed end of the regenerated bed to ambient air or connecting it to the feed blower.

or

Discontinuing the product repressurization and opening the feed end of the regenerated bed to ambient air.

$d_1$ Continuing the above step until pressure in the regenerated pressure equalized bed is close to or equal to ambient pressure.

$d_2$ Disconnecting the feed end of the regenerated bed from ambient air and connecting it to the feed blower.

e. Continuing the above step until the pressure in the regenerated bed is close to or equal to the predetermined adsorption pressure.

OR

E. Sequential Ambient Air and/or Feed and Product Repressurization, which consists of:

b. Connecting the feed end of the regenerated pressure equalized bed to ambient air or connecting it to the feed blower.

or Opening the feed end of the regenerated bed to ambient air.

b₁ Continuing the above step until pressure in the regenerated bed is close to or equal to ambient option described in FIG. 1 and Table 4 is given below:

TABLE 4

| Time (Sec) | \multicolumn{20}{c}{Valve Operation (Third Option - FIG. 1) Valve #} |
|---|

| Time (Sec) | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 0–5 |  | o |  |  |  | o |  | o | o |  |  |  | o |  | o |  |  |  |  |  |
| 5–20 |  | o |  |  |  | o | o |  |  |  |  |  | o |  | o | o |  |  |  |  |
| 20–25 | o |  |  |  |  | o |  |  |  | o | o | o | o |  | o |  |  |  |  |  |
| 25–30 | o |  |  |  |  | o |  |  |  | o | o |  | o | o |  |  |  |  |  |  |
| 30–45 | o |  |  |  |  | o |  | o |  |  |  |  | o | o |  |  |  |  | o |  |
| 45–50 |  |  | o |  |  |  |  | o | o | o |  |  | o | o |  |  |  |  |  |  |
| 50–55 |  |  | o |  |  |  |  | o | o | o |  |  |  | o | o |  |  |  |  |  |
| 55–70 |  |  | o | o |  |  | o |  |  |  |  |  |  | o | o |  | o |  |  |  |
| 70–75 | o |  |  | o |  |  |  |  |  | o | o |  |  | o | o |  |  |  |  |  |
| 75–80 | o |  |  | o |  |  |  |  |  | o | o |  | o |  | o |  |  |  |  |  |
| 80–95 | o |  |  | o |  | . | o |  |  |  |  |  | o |  | o |  |  | o |  |  |
| 95–100 |  | o |  |  |  | o | o | o |  |  |  |  | o |  | o |  |  |  |  |  | pressure.

b₂ Disconnecting the feed end of the regenerated bed from ambient air and connecting it to the feed blower.

c. Continuing the above ambient air and/or feed repressurization step until pressure in the regeneration bed has reached the predetermined pressure level, which is lower than the adsorption pressure.

d. Discontinuing the ambient air and/or feed repressurization step and connecting the product end of the regenerated bed with the product end of the bed on step 1 of its cycle.

e. Continuing the above step until the pressure in the regenerated bed is close to or equal to the predetermined adsorption pressure.

The bed is now ready to undergo a new cycle starting from step 1(a).

A third option is contemplated which utilizes the steps of option two, but during the cocurrent depressurization to provide pressure equalization gas, that bed is also simultaneously countercurrent evacuated. This latter evacuation is continued after the end of cocurrent depressurization as the countercurrent evacuation step. A process cycle chart for this third option is outlined in Table 3.

TABLE 3

Four Bed O₂ VSA

| Bed # | | | | | | | | | |
|---|---|---|---|---|---|---|---|---|---|
| A | SDP | | DES | | PU | PE | RP | A | DP1 |
| C | A | DP1 | SDP | | DES | | PU | PE | RP | A |
| B | PE | RP | | A | | DP1 | SDP | DES | | PU |
| D | DES | PU | PE | RP | A | | DP1 | SDP | DES |

A - Adsorption (Feed)
DP1 - First Cocurrent Depressurization to Provide Purge
SDP - Second Cocurrent Depressurization to Provide Pressure Equalization with simultaneous initiation of countercurrent evacuation
DES - Continued Countercurrent Evacuation
PU - Countercurrent Vacuum Purge
RP - Repressurization Flow schematic and hardware will be somewhat different for each of the process options of the present invention, depending upon plant capacity. FIG. 1 depicts a schematic for the third option with simultaneous ambient air and product repressurization. Two separate vacuum trains are employed. This is the preferred configuration for plant capacities greater than 100 TPD. Table 4 outlines the corresponding valve sequence for a typical cycle time. Detailed process description of the cycle at typical operating conditions for the process Ambient air compressed to feed pressure (~1100 mm Hg) by a feed blower enters Bed A through line 100, which Bed A has been already pressurized to adsorption pressure, via open valve 1. The Bed A is packed with adsorbent(s) selective for the removal of water, carbon dioxide, and nitrogen from air. Oxygen product is withdrawn via open valve 5 and line 101. Feed flow is switched to Bed C via open valve 3 after a predetermined time or as soon as nitrogen concentration in the effluent from Bed A reaches a preset limit. Pressure in Bed A is reduced by opening valve 9 and connecting Bed A with Bed B via open valve 10 and line 102. Bed B is being evacuated via open valve 14 and line 103 connected to vacuum blower 106. Valve 14 is kept open for a predetermined time or until pressure in Bed A reaches a preset "intermediate" level. Valve 14 is closed and valve 13 is opened. Bed A is now evacuated via open valve 13 while simultaneously providing gas to the product end of Bed B via open valves 9 and 10. Valves 9 and 10 are kept open for a predetermined time or until pressure in Bed A reaches a preset "lower" level. Valves 9 and 10 are then closed. Valves 9 and 10 are opened again at the end of the feed step in Bed B and upon reaching the "lowest" evacuation level pressure (~200 mmHG) in Bed A. Valve 13 is kept open for a predetermined time or until pressure in Bed B reaches a preset "intermediate" level. Valve 13 is then closed and valve 14 is opened. Valves 9 and 10 are kept open for a predetermined time or until pressure in Bed B reaches a preset "lower" limit. Valves 9 and 10 are then closed. Valves 5 and 17 are then opened to simultaneously repressurize Bed A by ambient air through line 105 and by the product being produced by Bed D and exiting via open valve 8 and line 101. When the pressure in Bed A reaches atmospheric, valve 17 is closed, and repressurization to "adsorption" pressure is completed through valve 5 only. Bed A is now ready to start a new cycle. Corresponding operation occurs for Bed C and Bed D for their evacuation through line 104 and vacuum blower 108. Smaller oxygen VSA systems, between 60–100 TPD, require only a single vacuum train. This is accomplished by routing gas from two different beds, in different stages of their evacuation step, to different stages of the vacuum train.

Figure 2:
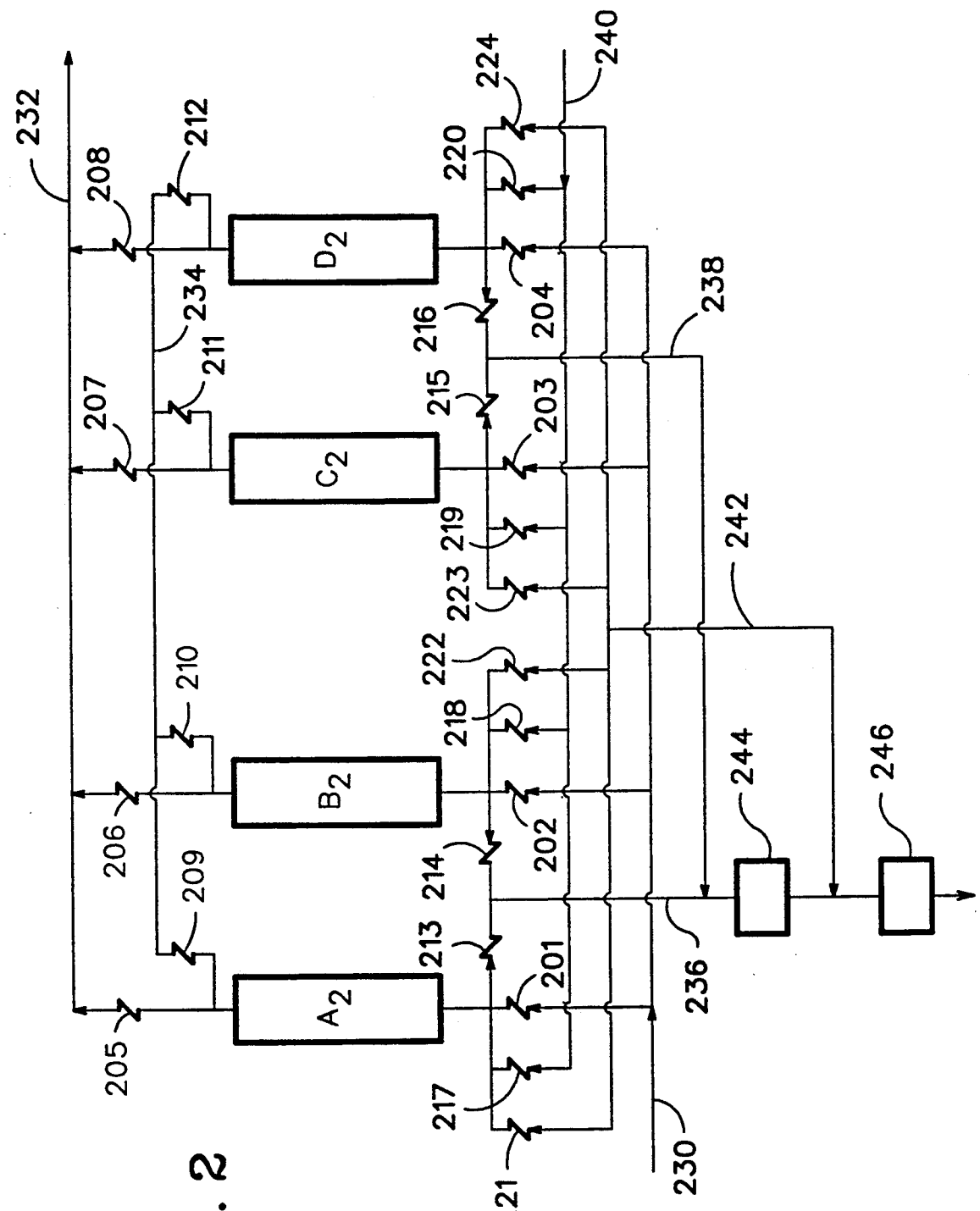
FIG. 2 is a schematic drawing of a second preferred embodiment of the present invention using four parallel adsorption beds and appropriate valve manifolding for feed, evacuation, purge, equalization and repressurization.

FIG. 2 illustrates such a configuration for the third cycle option with reference to the valve operations in Table 5. Waste gas from a bed undergoing the initial portion of its evacuation step is routed through vacuum pump second stage 246 via line 242 only. Waste gas from a bed undergoing the latter portion of its evacuation step flows through vacuum pump first 244 and second stage 246 via lines 236 and 238. This configuration makes optimal use of the two stage train. Two stages provide a power benefit, relative to a single stage at pressures below 380 mmHg.

The configuration in FIG. 2 allows the bed pressure to be reduced to an intermediate pressure of approximately 380 mmHg using a vacuum pump single stage 244 only. Two stages are then employed to reduce the bed pressure to the lowest pressure level. Table 5 outlines the corresponding valve sequence for a typical cycle time. Detailed process description for the option depicted in FIG. 2 and Table 5 is as follows:

Bed $A_2$ is reduced by opening valve 209 and connecting Bed $A_2$ with Bed $B_2$ via open valve 210 and line 234. Bed $B_2$ is being evacuated via open valve 214 and line 236 (line 238 is used in a similar manner for Beds $C_2$ and $D_2$). Valve 214 is kept open for a predetermined time or until pressure in Bed $A_2$ reaches a preset "intermediate" level. Valve 214 is closed and valve 221 is opened. Bed $A_2$ is now evacuated via open valve 221 and line 242 and vacuum pump second stage 246 while simultaneously providing gas to the product end of Bed $B_2$ via open valves 209 and 210 and line 234. Valves 209 and 210 are kept open for a predetermined time or until pressure in Bed $A_2$ reaches a preset "lower" level. Valves 209 and 210 are then closed. Bed $A_2$ is evacuated through valve 221 and line 242 until its pressure is approximately 380 mmHg and until the cocurrent depressurization to provide purge gas step between Bed $C_2$ and $D_2$ is complete. Valve 221 is closed and valve 213 opens. Bed $A_2$ is evacuated to approximately 200 mmHg through valve 213 and line 236 and the first 244 and second 246 stages of the vacuum pump. Bed $A_2$ is repressurized similar to the first described embodiment through line 234 and potentially lines 230 and 240.

Figure 3:
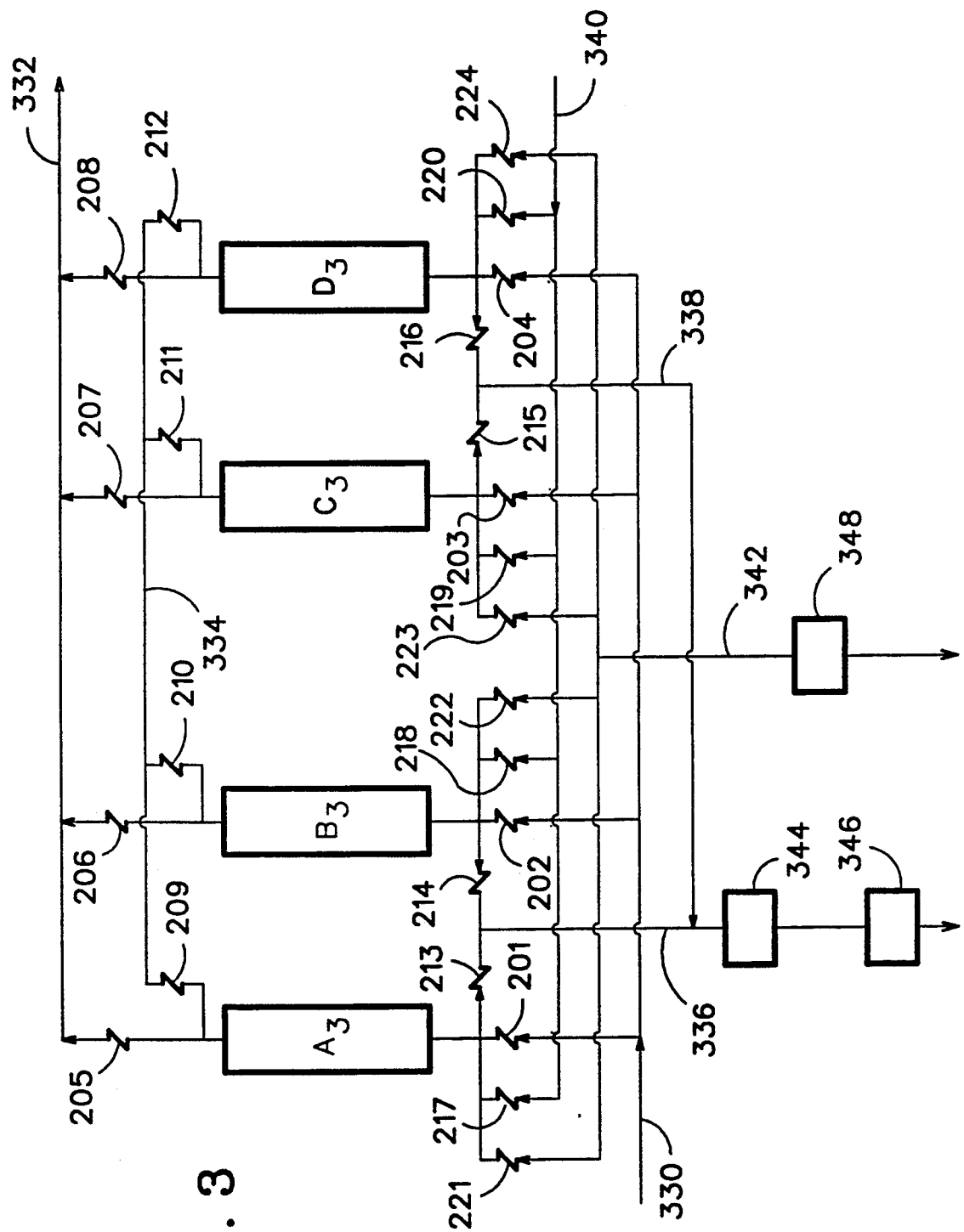
FIG. 3 is a schematic drawing of a third preferred embodiment of the present invention using four parallel adsorption beds and appropriate valve manifolding for feed, evacuation, purge, equalization and repressurization.

FIG. 3 illustrates a third configuration of the present invention. It employs a separate single stage vacuum pump 348 which performs the initial evacuation of each bed to approximately 380 mmHg via line 342. It replaces the interstage entry point on the vacuum train in FIG. 2. Valve sequence and process description are the TABLE 5
Valve Operation
(Third Option - FIGS 2 and 3)

| Time (Sec) | 201 | 202 | 203 | 204 | 205 | 206 | 207 | 208 | 209 | 210 | 211 | 212 |
|---|---|---|---|---|---|---|---|---|---|---|---|---|
| 0-5 |  | o |  |  |  |  | o |  | o | o |  |  |
| 5-20 |  | o |  |  |  | o | o |  |  |  |  |  |
| 20-25 |  | o |  |  |  | o |  |  |  |  | o | o |
| 25-30 |  | o |  |  |  | o |  |  |  |  | o | o |
| 30-45 |  | o |  |  |  | o |  | o |  |  |  |  |
| 45-50 |  |  |  | o |  |  |  | o | o | o |  |  |
| 50-55 |  |  |  | o |  |  |  | o | o | o |  |  |
| 55-70 |  |  |  | o | o |  |  | o |  |  |  |  |
| 70-75 | o |  |  |  | o |  |  |  |  |  | o | o |
| 75-80 | o |  |  |  | o |  |  |  |  |  | o | o |
| 80-95 | o |  |  |  | o |  | o |  |  |  |  |  |
| 95-100 |  | o |  |  |  |  | o |  | o | o |  |  |

| Time (Sec) | 213 | 214 | 215 | 216 | 217 | 218 | 219 | 220 | 221 | 222 | 223 | 224 |
|---|---|---|---|---|---|---|---|---|---|---|---|---|
| 0-5 |  |  |  | o |  |  |  |  | o |  |  |  |
| 5-20 |  |  |  | o |  | o |  |  | o |  |  |  |
| 20-25 |  |  |  | o |  |  |  |  | o |  |  |  |
| 25-30 | o |  |  |  |  |  |  |  |  | o |  |  |
| 30-45 | o |  |  |  |  |  |  | o |  | o |  |  |
| 45-50 | o |  |  |  |  |  |  |  |  | o |  |  |
| 50-55 |  |  |  |  |  |  |  |  |  | o |  |  |
| 55-70 |  |  | o |  | o |  |  |  |  | o |  |  |
| 70-75 |  |  | o |  |  |  |  |  |  | o |  |  |
| 75-80 |  | o |  |  |  |  |  |  |  |  |  | o |
| 80-95 |  | o |  |  |  |  | o |  |  |  |  | o |
| 95-100 |  | o |  |  |  |  |  |  |  |  |  | o |

Ambient air compressed to feed pressure ($\sim 1100$ mm Hg) by a feed blower enters Bed $A_2$, which has been already pressurized to adsorption pressure, via open valve 201 and line 230. The Bed $A_2$ is packed with adsorbent(s) selective for the removal of water, carbon dioxide, and nitrogen from air. Oxygen product is withdrawn via open valve 205 and line 232. Feed flow is switched to Bed $C_2$ via open valve 203 after a predetermined time or as soon as nitrogen concentration in the effluent from Bed $A_2$ reaches a preset limit. Pressure in same as for the previous option, and such valves are similarly numbered per the similar parts in FIG. 2 and operate identically to FIG. 2 valves per Table 5. Valves 209 and 210 are opened again at the end of the feed step in Bed $B_3$ and communicate with Bed $A_3$ via line 334. Valve 213 is kept open for a predetermined time or until pressure in Bed $B_3$ reaches a preset "intermediate" level. Valve 213 is then closed and valve 222 is opened to line 342. Valves 209 and 210 are kept open for a predetermined time or until pressure in Bed $B_3$ reaches a preset "lower" limit. Valves 209 and 210 are then closed. Valves 205 and 217 are then opened to simultaneously repressurize Bed $A_3$ by ambient air in line 340 and by the product being produced by Bed $D_3$ and exiting via open valve 208 and line 332. When the pressure in Bed $A_3$ reaches atmospheric, valve 217 is closed, and repressurization to "adsorption" pressure is completed through valve 205 only. Bed $A_3$ is now ready to start a new cycle. Each Bed $A_3$, $B_3$, $C_3$ and $D_3$ goes through a similar sequence using lines 330, 332, 334, 336, 338, 340, 342 and vacuum pumps 344, 346 and 348. The valves operate in an identical cycle sequence to FIG. 2 and Table 5.

EXAMPLE

The suggested third process option was simulated for a four bed process. Also, a three bed process consisting of similar steps as described in the third process option was simulated under identical conditions. The beds were packed with 1.25 ft of zeolite Na-X to remove water and carbon dioxide from ambient air towards the feed end and 5.75 ft of zeolite Ca-X to separate $N_2/O_2$ towards the product end. Table 6 compares the performance of the suggested cycle against a conventional 3 bed system. It is observed that for the same power consumption (columns 1 and 4), the suggested process produces ~55% more product by using only ~33% more adsorbent. On the other hand, if one tries to make a similar quantity of total product from a conventional three bed process and suggested four bed system (columns 3 and 4) power consumption for the suggested process is almost 10% lower than the conventional system.

As compared against two trains of 2 bed VSA processes, the suggested cycle does not idle the feed blower and does not require product storage tanks. Duplication of rotating equipment and associated central hardware is not required either. The suggested cycle is therefore less capital intensive and more power efficient than two 2 bed VSA trains.

In summary, the suggested process is more efficient than any prior art process for producing large quantities of oxygen (>60 TPD) by adsorption.

Any adsorbent(s) which can selectively remove water, carbon dioxide, and nitrogen from air can be used. Examples of adsorbents capable of removing nitrogen from air include zeolitic molecular sieves such as NaX, NaA, CaX, CaA, MgA, and other adsorbents with binary cations. Examples of adsorbents capable of removing water and carbon dioxide from air are aluminas, silica gels, and zeolites. Other desired properties of the adsorbents are (i) high crush strength, (ii) high attrition resistance, (iii) large bulk density, (iv) low interpartical void, (v) high heat capacity, (vi) large thermal conductivity, (vii) high $N_2/O_2$ selectivity, (viii) low oxygen capacity, and (ix) small particle size. Pressure drop through the adsorbent beds during adsorption and evacuation steps is also important for adsorbent selection.

To produce larger quantities of gas from an adsorption process, keeping all else constant, one has to run shorter cycles. This is the basis of rapid pressure swing adsorption processes (RPSA) in the literature. The first three columns of Table 6 reconfirm this concept, as it is observed that production from a three bed process increases from 47 to 59 to 80 tons of contained oxygen per day (TPD) as the total cycle time is reduced from 135 to 105 to 75 sec. However, as the total cycle time is reduced and all the rotating machinery (feed blower, product compressor, and vacuum pump) are run continuously, time available for evacuation reduces. This is demonstrated by the last row in Table 6. This in turn causes higher pressure drop and correspondingly higher specific power as the total cycle time is reduced. This is demonstrated by the second row in Table 6. Therefore, production of large quantities of gas from a three bed process increases specific power consumption. This is also the reason why RPSAs are used only for very small scale processes where high power consumption is secondary to low capital costs for economic success.

TABLE 6

Performance Comparison
Product Purity = 90% $O_2$
Product Pressure = 5 psig
$T_{Feed}$ = 120° F.
D, Bed = 12 ft
L, Bed = 7 ft
$P_{max}$ ~ 1100 mmHg
$P_{min}$ ~ 250 mmHg

| Process: | Conventional 3 Bed | | | Suggested 4 Bed |
|---|---|---|---|---|
| Cycle Time, sec. | 135 | 105 | 75 | 100 |
| Specific Power (KW/TPD) | 9.6 | 10 | 10.4 | 9.5 |
| Contained Production (TPD) | 47 | 59 | 80 | 73 |
| Productivity (TPD/Ton main adsorbent) | 1.3 | 1.6 | 2.2 | 1.5 |
| Evacuation Time, sec. | 45 | 35 | 25 | 50 |

The suggested cycle shown in its four bed arrangement in FIGS. 1, 2, and 3 circumvents these problems by evacuating two beds at any given time. This allows longer evacuation time for any given bed while keeping the total cycle time short. Cycle and evacuation times in Table 6 show that the ratio of evacuation time to total cycle time is 1:2 for these cycles whereas it is only 1:3 for 3 bed cycles.

The same concept can be extended to six beds by evacuating three beds at any given time or eight beds by evacuating four beds at any time, and so on so forth.

As compared with multi (or two) trains of two bed oxygen VSA processes, the current (four bed) process has the following advantages:

It does not require surge vessels as needed in two bed oxygen VSAs, and

It does not idle the feed blower, therefore, power consumption is minimized.

The present invention has been set forth with reference to several preferred embodiments, but the full scope of the present invention should be ascertained from the claims which follow.

We claim:

1. A process for selectively separating a more strongly adsorbable component from a less strongly absorbable component of a feed gas mixture in a plurality of adsorption beds containing an adsorbent selective for the more strongly adsorbable component, comprising the steps of:

(a) introducing a feed gas mixture at high pressure containing said more strongly absorbable component and said less strongly adsorbable component into an inlet of a first adsorption bed containing said adsorbent selective for the more strongly adsorbable component and adsorbing the more strongly adsorbable component on the adsorbent while the less strongly adsorbable component passes through said first bed unadsorbed until the adsorption front of the more strongly adsorbable component approaches an outlet of said first bed and terminating the introduction of the feed gas mixture;

(b) following the termination of the introduction of the feed gas mixture into said first bed and without any intervening steps, cocurrently depressurizing said first bed to a lower pressure to remove said gas mixture from said first bed and passing said gas mixture to an outlet of a second bed of said plurality of adsorption beds at lower pressure to countercurrently purge said more strongly adsorbable component from said second bed undergoing step (d);

(c) countercurrently evacuating said first bed under vacuum conditions to further remove said more strongly absorbable component at the lowest pressure;

(d) countercurrently purging said first bed with cocurrently depressurizing gas mixture from a bed of said plurality of adsorption beds undergoing step (b) to remove additional more strongly adsorbable component from said first bed;

(e) repressurizing said first bed with less strongly adsorbable component from a bed of said plurality of adsorption beds currently undergoing step (a) and with feed gas mixture; and (f) performing steps (a) through (e) in each of said plurality of adsorption beds in a phased sequence wherein at least two adsorption beds are countercurrently evacuated simultaneously in overlapping countercurrent evacuation steps in said plurality of adsorption beds.

2. The process of claim 1 wherein a bed undergoing step (e) is repressurized initially with feed gas mixture and then with said less strongly adsorbable component.

3. The process of claim 1 wherein a bed undergoing step (e) is repressurized with ambient pressure feed gas mixture and high pressure feed gas mixture.

4. The process of claim 3 wherein a bed undergoing step (e) is repressurized initially with ambient pressure feed gas mixture, then with high pressure feed gas mixture and finally with said less strongly adsorbable component.

5. The process of claim 1 wherein a bed undergoing step (e) is repressurized initially with ambient pressure feed gas mixture and then with said less strongly adsorbable component.

6. The process of claim 1 wherein a bed undergoing step (e) is repressurized initially with said less strongly adsorbable component and then with feed gas mixture.

7. The process of claim 1 wherein a bed undergoing step (e) is repressurized initially with said less strongly adsorbable component then with ambient pressure feed gas mixture.

8. The process of claim 1 wherein a bed undergoing step (e) is repressurized initially with said less strongly adsorbable component then with ambient pressure feed gas mixture and then with high pressure feed gas mixture.

9. The process of claim 1 wherein a bed undergoing step (e) is repressurized with said less strongly adsorbable component and said feed gas mixture simultaneously.

10. The process of claim 9 wherein a bed undergoing step (e) is repressurized with said less strongly adsorbable component and ambient pressure feed gas mixture simultaneously.

11. The process of claim 9 wherein a bed undergoing step (e) is repressurized with said less strongly adsorbable component and high pressure feed gas mixture simultaneously.

12. The process of claim 1 wherein said feed gas mixture is air, said more strongly adsorbable component is nitrogen and said less strongly adsorbable component is oxygen.

13. The process of claim 1 wherein a bed finishing cocurrent depressurization is then further cocurrent depressurized to pressure equalize with a bed of said plurality of adsorption beds finishing countercurrent purge while the former bed is simultaneously countercurrently evacuated.

14. A process for selectively separating a more strongly adsorbable component from a less strongly adsorbable component of a feed gas mixture in a plurality of adsorption beds containing an adsorbent selective for the more strongly adsorbable component, comprising the steps of:

(a) introducing a feed gas mixture at high pressure containing said more strongly adsorbable component and said less strongly adsorbable component into an inlet of a first adsorption bed containing said adsorbent selective for the more strongly adsorbable component and adsorbing the more strongly adsorbable component on the adsorbent while the less strongly adsorbable component passes through said first bed unadsorbed until the adsorption front of the more strongly adsorbable component approaches an outlet of said first bed and terminating the introduction of the feed gas mixture;

(b) following the termination of the introduction of the feed gas mixture into said first bed and without any intervening steps, cocurrently depressurizing said first bed to a lower pressure to remove said gas mixture from said first bed and passing said gas mixture to an outlet of a second bed of said plurality of adsorption beds at lower pressure to countercurrently purge said more strongly adsorbable component from said second bed;

(c) cocurrently depressurizing said first bed to further remove said gas mixture from said first bed and to pressure equalize said first bed with a bed of said plurality of adsorption beds finishing countercurrent purge of step (e);

(d) countercurrently evacuating said first bed under vacuum conditions to further remove said more strongly adsorbable component at a lowest pressure;

(e) countercurrently purging said first bed with cocurrently depressurizing gas mixture from a bed of said plurality of adsorption beds undergoing step (b) to remove additional more strongly adsorbable component from said first bed;

(f) countercurrently pressure equalizing said first bed with a bed of said plurality of adsorption beds at higher pressure undergoing said cocurrent depressurization of step (c);

(g) repressurizing said first bed with less strongly adsorbable component from a bed of said plurality of adsorption beds currently undergoing step (a) and with feed gas mixture; and (h) performing steps (a) through (g) in each of said plurality of adsorption beds in a phased sequence wherein at least two adsorption beds are countercurrently evacuated simultaneously in overlapping countercurrent evacuation steps in the plurality of adsorption beds.

15. The process of claim 14 wherein said feed gas mixture is air, said more strongly adsorbable component is nitrogen and said less strongly adsorbable component is oxygen.

16. A process for selectively separating nitrogen from oxygen in air in four adsorption beds containing an adsorbent selective for nitrogen, comprising the steps of:

(a) introducing feed air at high pressure into an inlet of a first adsorption bed containing said adsorbent selective for nitrogen and adsorbing nitrogen on the adsorbent while oxygen passes through said first bed unadsorbed as a product until the adsorption front of nitrogen approaches an outlet of said first bed and terminating the introduction of air into said first bed;

(b) following the termination of the introduction of air into said first bed and without any intervening steps, cocurrently depressurizing said first bed to remove void space gas and oxygen from said first bed and passing said void space gas and oxygen to an outlet of a second bed of said four adsorption beds at lower pressure to countercurrently purge said nitrogen from said second bed;

(c) cocurrently depressurizing said first bed to further remove said void space gas and oxygen from said first bed and to pressure equalize said first bed with a bed of said four adsorption beds finishing countercurrent purge of step (e);

(d) countercurrently evacuating said first bed under vacuum conditions to further remove said void space gas and nitrogen at a lowest pressure from the process;

(e) countercurrently purging said first bed with cocurrently depressurizing void space gas and nitrogen from a bed of said four adsorption beds undergoing step (b) to remove additional nitrogen from said first bed;

(f) countercurrently pressure equalizing said first bed with a bed of said four adsorption beds at higher pressure undergoing said cocurrent depressurization of step (c);

(g) repressurizing said first bed with oxygen from a bed of said four adsorption beds currently undergoing step (a) and with feed air; and (h) performing steps (a) through (g) in each of said four adsorption beds in a phased sequence wherein at least two adsorption beds are countercurrently evacuated simultaneously in overlapping countercurrent evacuation steps in the plurality of adsorption beds.

17. The process of claim 16 wherein said feed air is at a pressure in the range of approximately 14–30 psia.

18. The process of claim 16 wherein said feed air is at a pressure in the range of approximately 14–24 psia.

19. The process of claim 16 wherein at the end of evacuation the bed undergoing step (d) is at a pressure in the range of approximately 1–10 psia.

20. The process of claim 16 wherein a bed undergoing step (g) is repressurized with oxygen and ambient pressure feed air simultaneously.

21. The process of claim 16 wherein a bed undergoing step (g) is repressurized with oxygen and high pressure feed air simultaneously.

22. The process of claim 16 wherein a bed finishing cocurrent depressurization is then further cocurrent depressurized to pressure equalize with a bed of said four adsorption beds finishing countercurrent purge while the former bed is simultaneously countercurrently evacuated.

* * * * *